W. WORKMAN.
Seeding-Machines.
No. 156,688.  Patented Nov. 10, 1874.
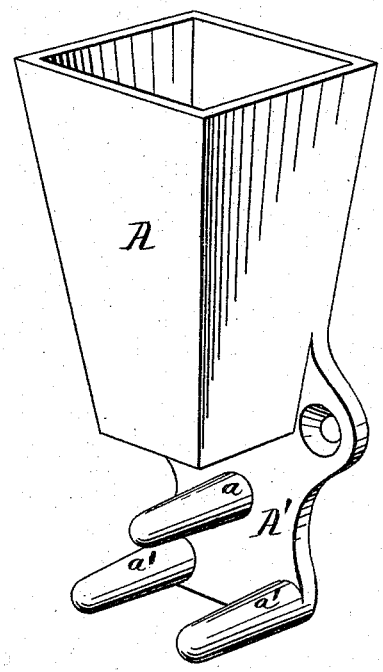
Witnesses
Alex Mahon
N. B. Smith
Inventor.
William Workman
G. W. Ford, Attorney
by A. M. Smith Associate

UNITED STATES PATENT OFFICE.

WILLIAM WORKMAN, OF DE PERE, WISCONSIN.

IMPROVEMENT IN SEEDING-MACHINES.

Specification forming part of Letters Patent No. 156,688, dated November 10, 1874; application filed July 17, 1874.

*To all whom it may concern:*

Be it known that I, WILLIAM WORKMAN, of De Pere, in the county of Brown and State of Wisconsin, have invented a new and useful Improvement in Seeding-Machines; and I do hereby declare that the following is a full and exact description of the same, reference being had to the accompanying drawings, and to the letters of reference marked thereon, which represent a perspective view of a seed-tube with my improvements applied.

My invention has for its object the improvement of that class of seeding-machines known as broadcast seeders; and relates to a novel construction and arrangement of the scatterer, said scatterer consisting of one or more cylindrical or slightly-tapering pins or spurs secured to a vertical plate, and arranged underneath or below the seed-discharge spout or tube in such manner that the seed, after it escapes from the tube, falls upon said cylindrical or conical pins, and is thrown off by them at varying angles, according to the angle or degree of inclination of that portion of the cylindrical surface on which it strikes, as hereinafter fully explained.

In the accompanying drawing, A represents the seed-tube, which is shown as being rectangular and slightly tapering in form; but it may be made straight or round, as desired. This tube has cast with or otherwise secured to it a plate, A', by which it is connected with the machine, and to which the pins or spikes $a$ $a'$ are secured. These pins may also be cast with the tube and plate; or, if desired, the plate may be provided with screw-threaded perforations at different points, and the pins provided with screw-threaded shanks, so that they may be arranged on the plate in any desired manner.

I have shown the pins in this instance arranged in the form of a triangle—that is, one pin immediately below and in line with the center of the tube, and having one upon each side and below it, so that as the seeds are discharged from the tube they strike upon the pin $a$, which divides the mass of grain and causes a portion to fall upon each of the pins $a'$, and by the cylindrical tapering form given to said pins the grain is caused to strike upon them at different angles of inclination, and thereby to be thrown from them at varying angles, and to fall upon the ground nearer to or farther from the pins, according to the angle at which it strikes, thus scattering and distributing the grain evenly over the ground.

The tube is secured to the bar under the seed-box, with the ends of the pins or spikes pointing to the rear, so that the seeds are thrown from off the pins either to the right or left, or to the rear of the machine, the plate A' preventing the seed from being thrown forward.

I am aware that a series of upright spurs or pins have been employed, arranged upon an inclined plane or table, for the purpose of dividing the stream of descending grain and spreading it out into a broad thin sheet before it is discharged from the inclined plane upon the ground; but in this construction it will be seen that the inclined plane forms an essential element of the scattering device, while in my construction the scattering of the grain is effected solely by the horizontal cylindrical pins, and the vertical plate A', or its equivalent, is essential only as a point of support for the pins in the distribution of the grain.

Having thus described my invention, what I claim as new, and desire to secure by Letters Patent, is—

The horizontal scattering-pins $a$ $a$, made cylindrical or conical in form, and applied to the vertical plate A' below the discharge-outlet in the spouts or tubes A, all arranged and operating substantially as described.

This specification signed and witnessed this 3d day of July, 1874.

WILLIAM WORKMAN.

Witnesses:
S. E. BALDWIN,
JAS. McDOUGALL.